March 16, 1954   K. P. BILLNER   2,671,940
MOLDING APPARATUS
Filed Feb. 7, 1949   4 Sheets-Sheet 1

INVENTOR
KARL P. BILLNER,
BY Raymond Wootten
ATTORNEY

March 16, 1954
K. P. BILLNER
2,671,940
MOLDING APPARATUS
Filed Feb. 7, 1949
4 Sheets-Sheet 2
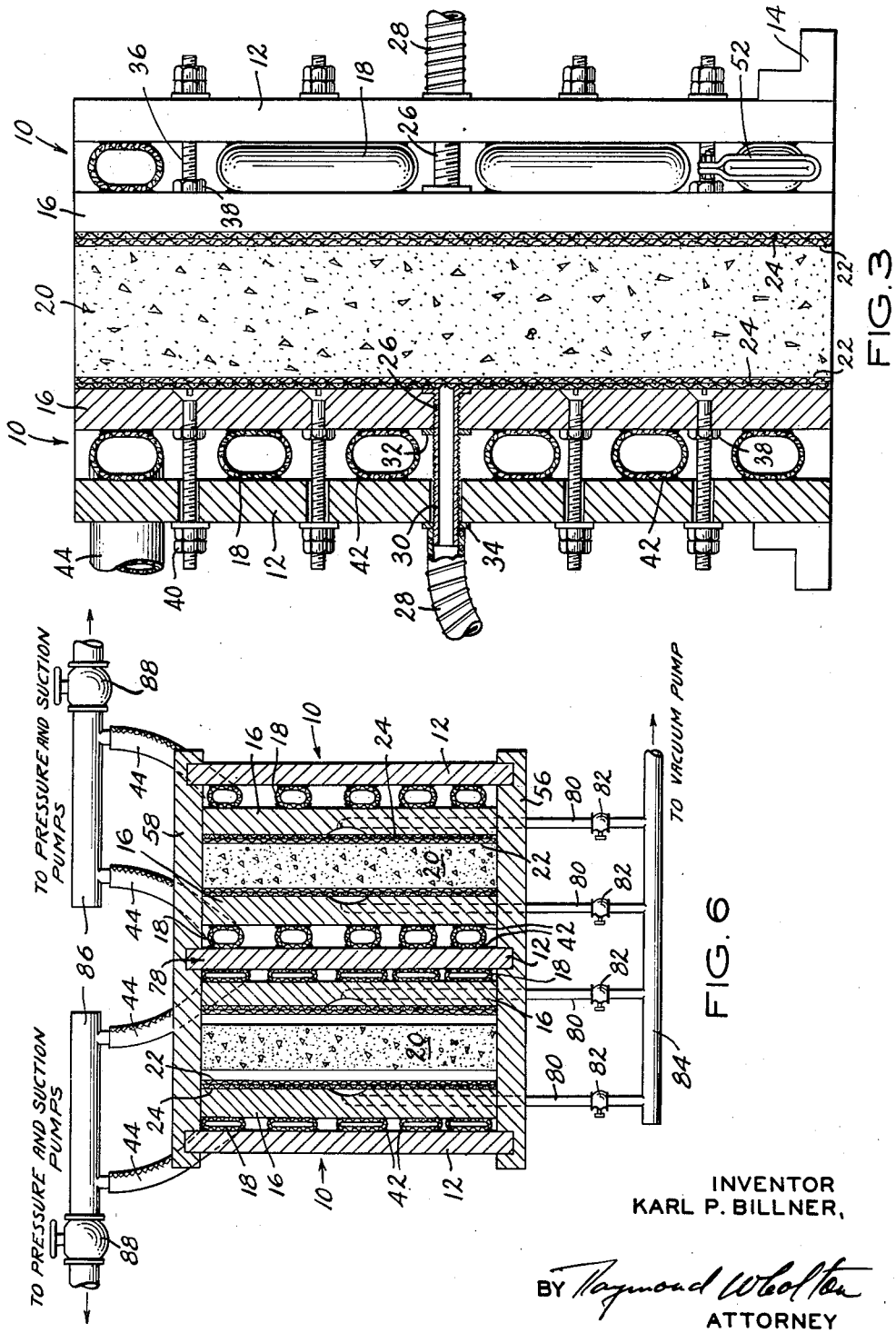
INVENTOR
KARL P. BILLNER,
BY Raymond W Colton
ATTORNEY

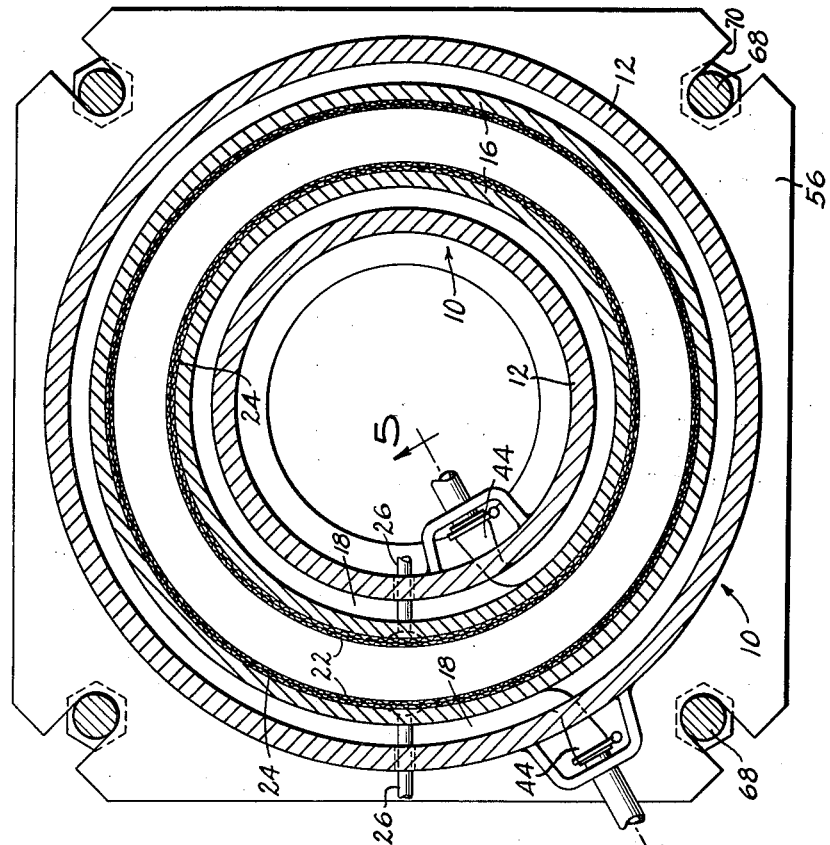
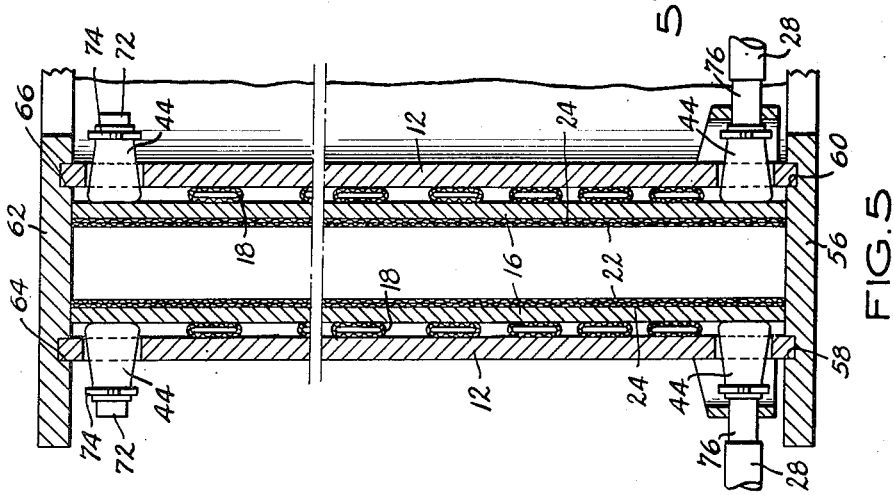

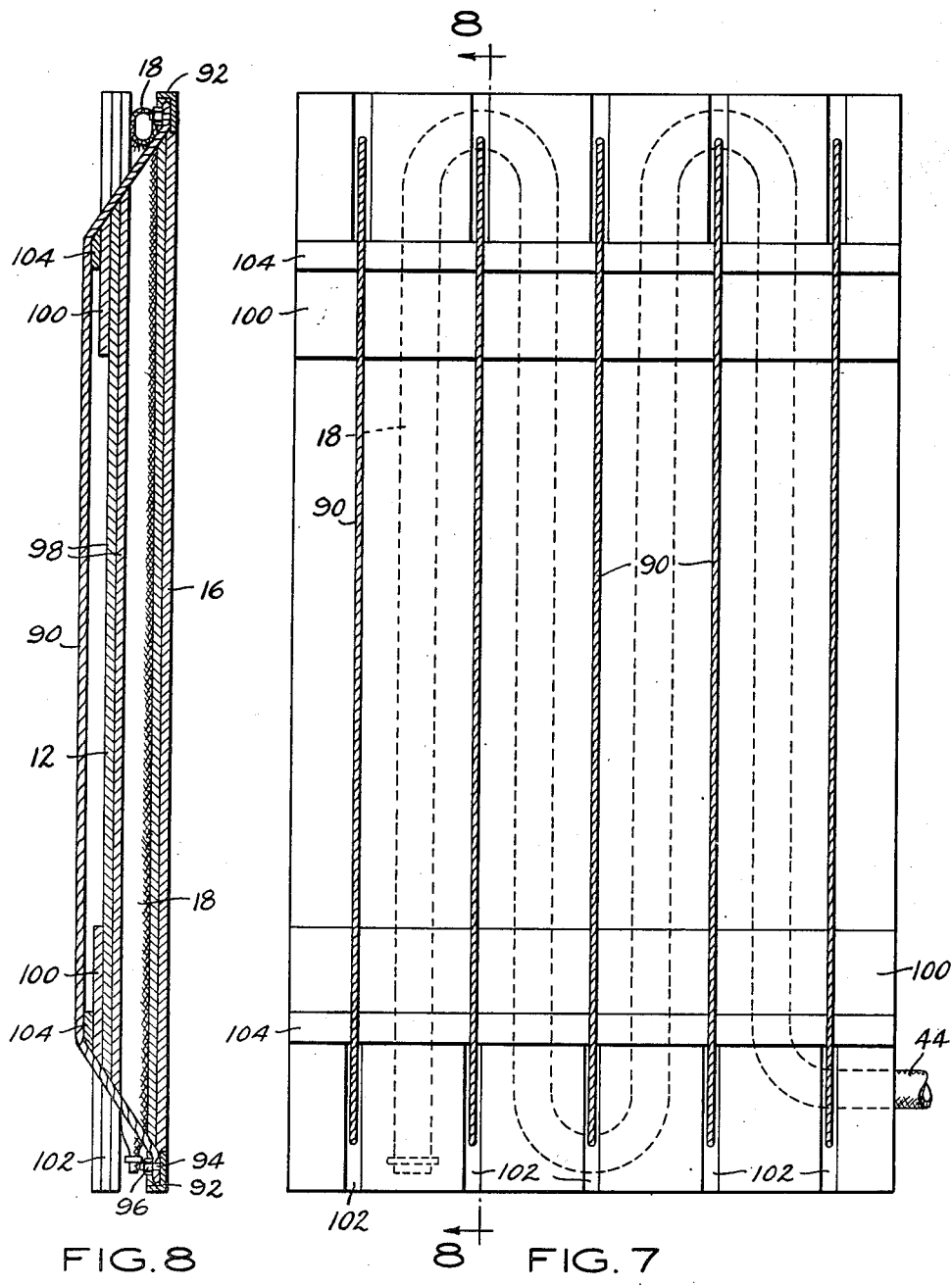

Patented Mar. 16, 1954

2,671,940

UNITED STATES PATENT OFFICE 2,671,940

MOLDING APPARATUS

Karl P. Billner, Philadelphia, Pa., assignor to Vacuum Concrete, Inc., a corporation of Pennsylvania Application February 7, 1949, Serial No. 75,040

4 Claims. (Cl. 25—91)

This invention relates to plastic molding apparatus particularly well adapted for forming concrete bodies.

In addition to the long felt needs of cast-in-place construction, the increasing activity in the field of precasting concrete bodies, has created a growing demand for forms which can be handled rapidly, used repeatedly, and separated from the formed body much sooner than is possible with apparatus of the more customary types.

It is among the objects of the present invention to provide such improved apparatus for molding precast and cast-in-place bodies having widely varying configurations, and includes the production of pipes, piles, beams, columns, walls, roofs, floors, slabs, and other structural members and shapes.

The plastic molding apparatus of the present invention comprises spaced relatively movable walls at least one of which provides a surface for engagement with a plastic body, an expansible tubular hose section interposed between proximate surfaces of the walls, and means for connecting the hose section with subambient and superambient fluid pressure sources selectively, to impart relative movement to the walls. It is contemplated that a plurality of coextensive sections be interposed between the walls and that they be connected in series. Such a plurality of sections may be defined by a serpentine hose having multiple passes interposed between the walls, and where such sections are arranged one above another, they may be unequally spaced so as to be more proximate at the lower portions of the walls to compensate for the effects of hydrostatic pressure. Where the walls are annularly or concentrically arranged, the hose may be interposed between them in substantially helical form.

It is contemplated that portions of the hose or hose sections be adhesively secured to the walls so that relative movement of the walls will occur in both directions as result of changes in pressure applied to the hose. The apparatus may be provided with means to restrict relative movement of the walls and for positioning the hose elements with respect to the walls.

The wall surface or surfaces for engagement with the plastic body may be rendered liquid pervious for removal of excess vehicle from the plastic body, in which event means are contemplated for connecting the pervious surface with a subambient fluid pressure source. The apparatus may comprise a plurality of opposed form units each having movable walls, providing opposed surfaces for engagement with opposite surfaces of the plastic body, and such wall surfaces may be liquid pervious for removing excess vehicle. The walls may be substantially parallel, and in some cases, depending upon the article being molded, annular. A plurality of concentric form units may be employed to provide spaced relatively movable walls providing opposed surfaces for engagement with opposite surfaces of a plastic body such as a pipe or pile. The provision of one or more water pervious surfaces for extracting vehicle in excess of that required for setting of the plastic body is particularly desirable in connection with the molding of concrete.

A more complete understanding of the invention will follow from the description of the accompanying drawings wherein:

Fig. 3 is an elevation partially in section taken along line 3—3 of Fig. 1, from which an end of the form and the abutments have been removed;

Fig. 4 is a plan view partially in section illustrating the invention as applied to the molding of an annular body;

Fig. 5 is a fragmentary sectional elevation taken along line 5—5 of Fig. 4;

Fig. 6 is a sectional elevation of a modified form;

Fig. 7 is an elevation of another modification; and

Fig. 8 is a section taken along line 8—8 of Fig. 7.

Figure 2:
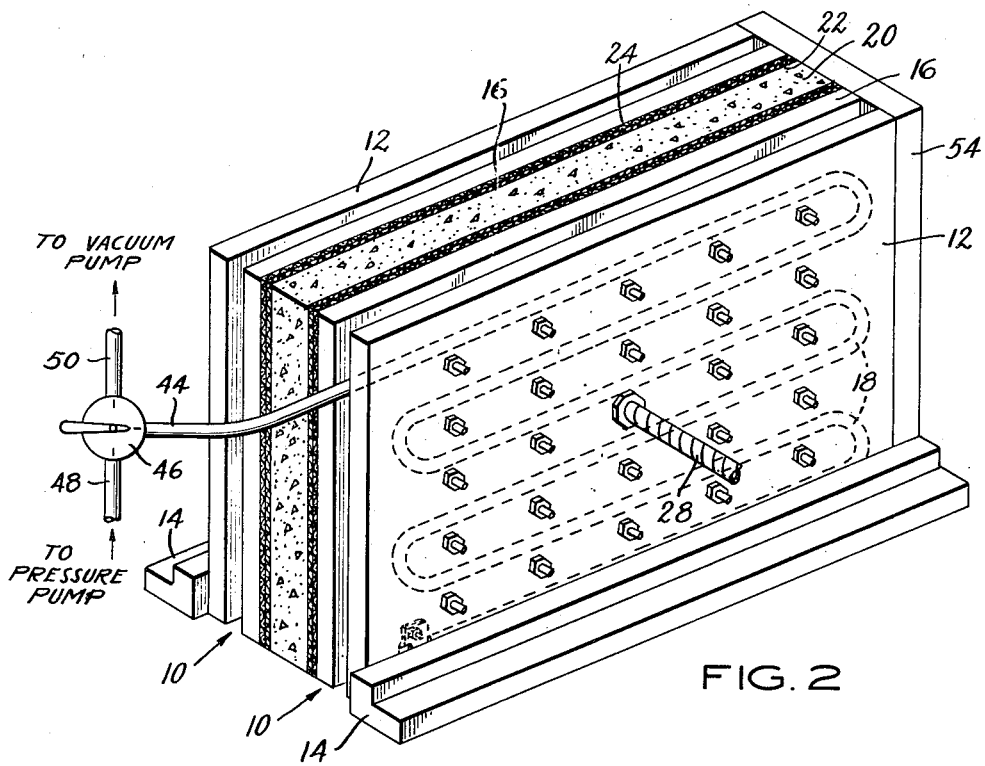
Fig. 2 is an isometric view of the apparatus depicted in Fig. 1, one of the end closures having been removed.
Figure 1:
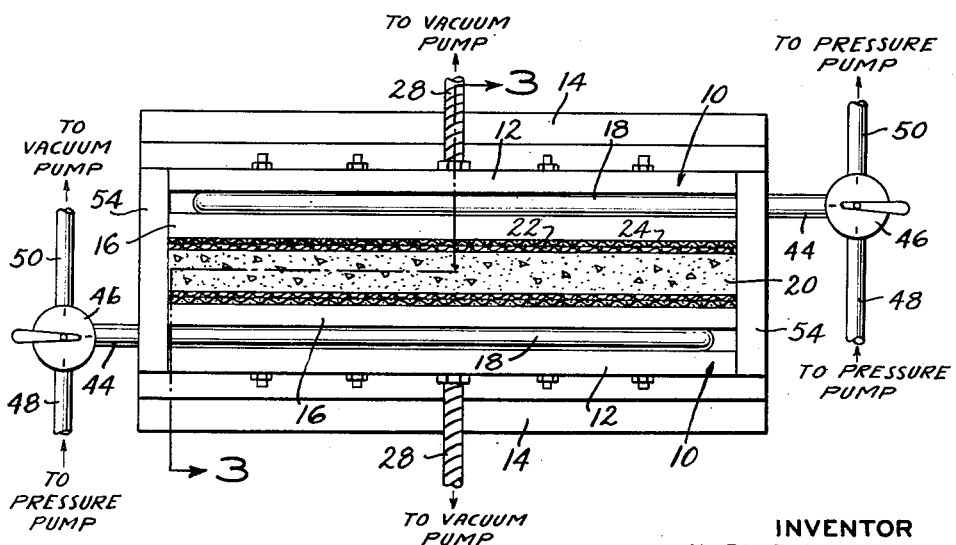
Fig. 1 is a plan view of molding apparatus embodying the present invention.

With particular reference to Figs. 1, 2 and 3, opposed units 10 have their remote or backing walls 12 relatively fixed to suitable abutments 14 whose spacing depends upon the dimensions of the body to be molded. Each of the units includes a proximate relatively movable wall 16 between which and its respective backing wall there is interposed an expansible tubular hose 18 arranged in a reentrant or serpentine fashion to define a plurality of passes or sections arranged one above the other, and as clearly shown in Fig. 3, the sections are unequally spaced so as to be more proximate at the lower portions of the apparatus where the effects of hydrostatic pressure are greatest.

The surfaces of the proximate walls 16 intended to engage the plastic body 20 are defined by a water pervious woven fabric 22 which is superimposed upon a layer of wire mesh 24, suitably secured to the walls. These pervious surfaces communicate with one or more tubes 26 suitably secured to the respective inner walls and project freely through enlarged openings formed in the remote walls 12, with respect to which the tubes are readily movable.

The projecting ends of the tubes 26 receive flexible hose lines 28 through which they communicate with a source of subambient pressure. The tubes 26 may be provided with threads 30 for the reception of clamping nuts 32 to secure them to the relatively movable walls and limiting nuts 34 to restrict relative movement between the walls constituting a unit. Between adjacent hose sections, bolts 36 are interposed at intervals for uniformly limiting relative movement between the walls of the units and for preventing any appreciable displacement of the hose sections from their intended positions. The bolts 36 are secured to the proximate walls 16 by means of nuts 38, the ends of the bolts projecting freely through openings in the remote walls 12 where they receive limiting nuts 40 to prevent excessive separation of the walls.

Portions of the hose surfaces are secured to the walls of each unit by means of a suitable adhesive 42, or in some other appropriate manner, so that when the hose sections tend to collapse, the proximate walls will be moved towards their respective backing walls. One end of each hose section can be connected selectively with a source of subambient pressure or superambient pressure through a connecting line 44, which as depicted in Figs. 1 and 2 leads to a three-way valve 46 having a pressure connection 48 and a vacuum connection 50. As shown in Fig. 3, the other end of the hose section can be closed by means of a suitable clamp 52.

In operation, when it is desired to pour a concrete body, the form units and their abutments will be secured in properly spaced relationship, and the hose sections will be expanded by admitting a suitable liquid, such as water, under pressure through the valves 46. The relatively movable walls 16 will then approach one another to an extent depending upon the liquid pressure and the adjustment of their limiting stops, whereupon concrete will be poured between them and subjected to such operations as screeding and vibrating as may be desired. The vacuum lines 28 will be connected with their subambient pressure sources so that the excess water will be extracted from the plastic concrete mix through the liquid pervious faces defined by the fabric 22 and mesh 24 on the proximate surfaces of the walls or mats 16. After the desired amount of water has been extracted from the concrete mix and the concrete body has become sufficiently self supporting, the valves 46 will be adjusted to place the sections of the hose 18 in communication with a subambient pressure source which will extract the previously admitted liquid and cause the hose sections to collapse, thereby moving the relatively movable walls or mats towards their respective backing walls and out of contact with the concrete body. The concrete body can then be removed from the form whose end walls 54 or a suitable top closure can be rendered removable to facilitate the separation.

Apparatus for applying the invention to the production of piles, pipes and other annular or tubular bodies, has been illustrated in Figs. 4 and 5 of the drawing, wherein similar parts have been identified by reference characters corresponding to those of the preceding embodiment insofar as they are applicable. In this case a lower base 56 is provided with concentric grooves 58 and 60 to receive the lower edges of the relatively fixed remote walls 12, which are extended slightly below the proximate walls 16 for cooperation with these grooves. An upper base 62 is provided with similar annular grooves 64 and 66 to receive the projecting upper ends of the remote relatively fixed walls 12 which project for this purpose beyond their respective relatively movable walls. The upper and lower bases are adapted to be secured together by means of bolts 68 received in appropriate notches 70 formed in the bases. The remote relatively stationary walls 12 are substantially rigid and have the sections of hose 18 adhesively or otherwise suitably secured thereto in a manner and for the purpose described in connection with the preceding example, but in this case, the hose is substantially helically arranged, the lower sections again being more proximate to take into account the effects of the hydrostatic head of the liquid plastic mixture to be introduced between the walls.

In this case, both ends of the hose 18 extend beyond the walls, the upper ends being closed by means of plugs 72 and clamps 74, the lower ends receiving nipples 76 for communication with the sources of pressure and vacuum. The proximate walls 16 are faced with the liquid pervious layers defined by a suitable woven fabric 22 and woven wire mesh 24 for removal of excess vehicle from the plastic mix by the application of subambient pressure through connecting lines 28. These proximate walls may be composed of steel, aluminum, or other materials which will yield sufficiently under the force of the liquid under pressure admitted to the hose sections, so that after the plastic body has been molded between them and the subambient pressure source connected with the hose sections, the walls will be withdrawn from the molded body sufficiently to permit its removal from the form after the upper base has been removed. The sequence of operations utilizing the effects of pressure and vacuum are similar in this case to those described with reference to Figs. 1, 2 and 3 and the detailed operation need not be repeated at this point.

A further modification of the invention is depicted in Fig. 6 where again the reference characters will correspond with those of the preceding examples as far as applicable. The multiple form depicted in this figure comprises outer units 10 similar to those described with reference to Figs. 1, 2 and 3, and an intermediate unit 78 comprising a central or backing wall 12 supporting a pair of relatively movable walls 16, each of the relatively movable walls being adhesively connected to hose sections 18 which are in turn adhesively secured to the central wall. Each of the backing walls 12 has projecting ends received in grooves formed in the lower and upper bases 56 and 58 respectively so that these walls will be relatively fixed when the molding apparatus has been assembled with respect to its bases. The relatively movable walls 16 are faced with the liquid pervious fabric 22 and mesh 24 for removing excess vehicle from the plastic mix. These water pervious surfaces are connected through hose lines 80 and valves 82, with a manifold 84 in communication with a vacuum pump. Accordingly, by manipulating the valves 82, the water pervious surfaces can be rendered effective or ineffective for the removal of vehicle from the plastic mix. The hose sections 18 interposed between each backing wall and its relatively movable wall or walls, provide projecting portions 44 for connection with a manifold 86 provided with a valve 88 for communication selectively with the pressure and suction sources. It will be noted that the hose sections depicted to the left of the center of Fig. 6 are in collapsed condition as result of the effects of a vacuum pump to which the left hand manifold 86 has been connected, with the result that the relatively movable walls 16 of this portion of the figure have withdrawn from contact with the concrete body 20, which is now self supporting and ready for removal through the top or end of the form, depending upon which of the form walls is to be removable.

The hose sections 18 depicted to the right of the center of Fig. 6 are in expanded condition due to the connection of their manifold 86 with the liquid under pressure admitted through the right hand valve 88. In this instance, the relatively movable walls bear upon the plastic material 20 and one or both of the right hand valves 82 may be open under these conditions to withdraw excess vehicle from the mix.

It will be understood from the foregoing description that the liquid under pressure serves to compact the plastic mix as well as to position the walls defining the form. Accordingly, as excess vehicle is withdrawn through the pervious surface or surfaces applied to the concrete for example, the reduced volume will permit the movable walls to advance farther under the effect of the liquid pressure within the hose sections resulting in highly compacted concrete bodies which display many improved characteristics over concrete bodies produced by more customary methods.

The modified construction shown in Figs. 7 and 8 utilizes hose sections which extend vertically between the relatively movable two-ply forming wall 16 and its backing wall 12. These walls are assembled by means of flexible cables 90 whose ends are secured to the upper and lower edges of the forming wall 16 by means of flush angles 92 which are fastened to the form by bolts 94 and nuts 96. The backing wall, shown as constructed of two plies 98, is reinforced at its upper and lower edges by an additional ply 100, the three plies being cut to form slots 102 corresponding in number and position to the spaced cables 90. Metallic bearing plates 104 are interposed between the cables and the outermost ply 100 to distribute the forces of the cables over a larger area and avoid damage to the softer plywood surfaces.

The relationship of parts shown in Fig. 8 is that produced when the hose sections have been inflated through the connecting hose line 44; and when the pressure is removed, the hose sections will be relatively collapsed. The cables serve to limit the relative movement between the walls in both extended and collapsed condition, and render the assembly readily portable without requiring dismantling. Here again, the hose sections may be adhesively affixed to the walls to retain them in their properly spaced relationship. As in the cases previously discussed, in use, the backing wall of the form will be positioned as desired relative to the work, whereupon pressure will be applied to move the forming wall to its position for the molding operation. Subsequently, the suction may be applied to collapse the sections for removal relative to the molded body.

The expressions "subambient" and "superambient" have been employed to define pressures in the same sense that "subatmospheric" and "superatmospheric" respectively, are customarily used, there being no significant difference so long as "atmospheric pressure" is understood to be the surrounding pressure of the "atmosphere" regardless of altitude and irrespective of the nature of the medium. In other words, "subatmospheric" as employed in the claims signifies a pressure below that immediately surrounding an operation, numerically below 14.7 lbs. per sq. in. at sea level, yet possibly above this value where the operation is performed under a hydrostatic head. Similarly, "superatmospheric" in the appended claims denotes a pressure exceeding that immediately surrounding an operation, and conceivably could be less than 14.7 lbs. per sq. in.

Whereas only a relatively few examples of apparatus embodying the invention have been illustrated and described, variations and modifications will occur to those skilled in the art just as they have been recognized already by the present inventor, and accordingly, the invention should not be restricted to these examples beyond the scope of the appended claims.

I claim:

1. Concrete molding apparatus comprising a form having spaced relatively movable walls at least one of which provides a water pervious surface for engagement with a plastic concrete body, an expansible tubular hose section interposed between and partially secured to proximate surfaces of said walls, said hose section having a surface area substantially less than that of said surface, means for connecting said hose section with superatmospheric and subatmospheric fluid pressure sources to impart relative movement to said walls by expansion and contraction of said hose section, and means for connecting said water pervious surface with a subatmospheric pressure source for removing excess water from the plastic concrete body.

2. Concrete molding apparatus comprising a pair of forms each having a relatively fixed wall and a relatively movable wall for engagement with opposed surfaces of a plastic concrete body, expansible tubular hose members interposed between and partially secured to the fixed and movable walls of each form, means for connecting said hose members with superatmospheric and subatmospheric fluid pressure sources to impart relative movement to said movable walls by expansion and contraction of said hose members, said movable walls having water pervious surfaces, and means for connecting said water pervious surfaces of said walls with a fluid pump.

3. Plastic molding apparatus comprising spaced relatively movable walls at least one of which provides a liquid pervious surface for engagement with a plastic body and removal of excess vehicle therefrom, an expansible tubular hose section interposed between and partially secured to proximate surfaces of said walls, said hose section having a surface area substantially less than that of said surface, means for connecting said hose section with subatmospheric and superatmospheric fluid pressure sources to impart relative movement to said walls and means for connecting said pervious surface with a subatmospheric fluid pressure source.

4. Plastic molding apparatus comprising spaced relatively movable walls providing opposed liquid pervious surfaces for engagement with a plastic body, an expansible tubular hose section interposed between and partially secured to proximate surfaces of said walls, means for connecting said hose section with subatmospheric and superatmospheric fluid pressure sources to impart relative movement to said walls and means for connecting said pervious surfaces with a subatmospheric fluid pressure source while said hose section is connected with a superatmospheric fluid pressure source.

KARL P. BILLNER.

References Cited in the file of this patent

UNITED STATES PATENTS

| Number | Name | Date |
|---|---|---|
| 1,634,047 | Smith | June 28, 1927 |
| 1,945,145 | Gordon | Jan. 30, 1934 |
| 2,046,867 | Billner | July 7, 1936 |
| 2,048,253 | Freyssinet | July 21, 1936 |
| 2,296,018 | Boyle | Sept. 15, 1942 |
| 2,311,588 | Denning | Feb. 16, 1943 |
| 2,375,148 | Terry | May 1, 1945 |
| 2,411,043 | Klassen | Nov. 12, 1946 |

FOREIGN PATENTS

| Number | Country | Date |
|---|---|---|
| 6,751 | Great Britain | Mar. 17, 1914 |